(12) United States Patent
Aono et al.

(10) Patent No.: US 10,927,905 B2
(45) Date of Patent: Feb. 23, 2021

(54) CENTRIFUGAL CLUTCH

(71) Applicant: Kabushiki Kaisha F.C.C., Shizuoka (JP)

(72) Inventors: Kaoru Aono, Shizuoka (JP); Yuta Yokomichi, Shizuoka (JP); Yuta Kine, Shizuoka (JP); Makoto Kataoka, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 93 days.

(21) Appl. No.: 16/344,710

(22) PCT Filed: Sep. 22, 2017

(86) PCT No.: PCT/JP2017/034224
§ 371 (c)(1),
(2) Date: Apr. 24, 2019

(87) PCT Pub. No.: WO2018/083908
PCT Pub. Date: May 11, 2018

(65) Prior Publication Data
US 2019/0338813 A1    Nov. 7, 2019

(30) Foreign Application Priority Data

Nov. 7, 2016   (JP) .............................. JP2016-216850

(51) Int. Cl.
*F16D 43/18* (2006.01)
(52) U.S. Cl.
CPC ................... *F16D 43/18* (2013.01)
(58) Field of Classification Search
CPC ..... F16D 43/14; F16D 43/18; F16D 2043/145
See application file for complete search history.

(56) References Cited

U.S. PATENT DOCUMENTS

| 2,087,968 A | 7/1937 | Dodge |
| 3,971,462 A | 7/1976 | Johansson |

(Continued)

FOREIGN PATENT DOCUMENTS

| EP | 2375093 A2 | 10/2011 |
| EP | 2740959 A2 | 6/2014 |

(Continued)

OTHER PUBLICATIONS

International Search Report dated Dec. 12, 2017 filed in PCT/JP2017/034224.

(Continued)

*Primary Examiner* — Charles A Fox
*Assistant Examiner* — Lori Wu
(74) *Attorney, Agent, or Firm* — Rankin, Hill & Clark LLP (57) ABSTRACT

A centrifugal clutch that can suppress the inclination of a clutch weight, realize smooth oscillation, and suppress the uneven wear of a clutch shoe is provided. A drive plate (210) slidably supports a clutch weight (230) and also supports a projection body (218) via a projection body support pin (216). The clutch weight (230) includes a first spring attachment part (231) and a second spring attachment part (234) to which two clutch springs (235) are attached formed, and a driven part (238) that comes into contact with the projection body (218) formed. The projection body (218) and the driven part (238) are formed in a manner that a projection body range (TE) where the projection body (218) and the driven part (238) come into contact overlaps action positions (FP1) and (FP2) of forces (F1) and (F2) of the clutch spring (235) acting on the clutch weight (230) in the thickness direction of the clutch weight (230).

6 Claims, 7 Drawing Sheets

(56) References Cited

U.S. PATENT DOCUMENTS 4,226,320 A * 10/1980 St. John .................. F16D 43/18
                                                    192/105 CD
2009/0250306 A1* 10/2009 Harada .................. F16D 43/18
                                                    192/103 A
2011/0240433 A1    10/2011 Fang et al.

FOREIGN PATENT DOCUMENTS

| JP | 49-109752 A    | 10/1974 |
| JP | 53-072047 U1   | 6/1978  |
| JP | 3168535 U      | 6/2011  |
| JP | 2015-203429 A  | 11/2015 |

OTHER PUBLICATIONS

Extended European Search Report (EESR) dated Jun. 17, 2020 issued in the corresponding European Patent Application No. 17867534.4.

* cited by examiner

CENTRIFUGAL CLUTCH

TECHNICAL FIELD

The present disclosure relates to a centrifugal clutch that cuts off the transmission of the rotational driving force to the driven side until the engine reaches predetermined rotational speed and transmits the rotational driving force to the driven side when the engine reaches predetermined rotational speed.

BACKGROUND ART

A centrifugal clutch that transmits the rotational driving force to the driven side when the engine reaches predetermined rotational speed has typically been used in motorcycles and mowers. For example, the centrifugal clutch disclosed in Patent literature 1 has the configuration below. The first drive plate and the second drive plate that rotate relative to each other are provided with a cam body as a projection body and a clutch weight. A part of the clutch weight runs on the projection body. Thus, in the centrifugal clutch described in Patent literature 1, the clutch shoe strongly presses the clutch outer part. Thus, so-called clutch capacity, which is the magnitude of the power that can be transmitted, can be increased.

CITATION LIST

Patent Literature

Patent literature 1: JP-A-2015-203429

However, in the centrifugal clutch described in Patent literature 1, the drive plate that is rotated by the rotation of the engine includes the first drive plate and the second drive plate. Thus, there has been an issue that the increase in the number of components complicates the configuration and increases the manufacturing load.

Therefore, the Applicant of the present application has proposed a centrifugal clutch in Japanese Application No. 2016-140425, which corresponds to U.S. application Ser. No. 16/316,852. In the centrifugal clutch, the pin slide hole that is formed on the clutch weight and fits the oscillation support pin is formed in a long hole shape. Thus, the first drive plate and the second derive plate can be formed as an integral one drive plate.

However, the centrifugal clutch including a pin slide hole formed in a long hole shape has an issue below. When the clutch weight is pulled by two clutch springs, it tends to be inclined inside in the radial direction of the drive plate with the projection body as a starting point. This increases the oscillation resistance of the clutch weight and suppresses smooth oscillation. Further, the inclination of the clutch shoe with respect to the inner peripheral surface of the clutch outer part causes uneven wear.

The present disclosure has been made to address the above issue. The object of the present disclosure is to provide a centrifugal clutch that can suppress the inclination of a clutch weight, realize smooth oscillation, and suppress the uneven wear of a clutch shoe.

SUMMARY OF THE INVENTION

In order to achieve the above-described object, a feature of the present disclosure is a centrifugal clutch that includes: a drive plate that receives driving force of an engine and is rotationally driven integrally with a driven pulley; a clutch outer part that includes a tubular surface provided to be concentric to the drive plate outside the drive plate; a plurality of clutch weights that includes a clutch shoe that is formed to extend along a circumferential direction of the drive plate and faces the tubular surface of the clutch outer part, one end part side in the circumferential direction that is rotatably attached on the drive plate via an oscillation support pin and a long hole-shaped pin slide hole, and the other end part side that is displaced toward a side of the tubular surface of the clutch outer part; a side plate that is adjacently disposed on an opposite side of the drive plate with respect to the plurality of clutch weights; projection body that is provided on the drive plate or the side plate to protrude toward the clutch weight; a driven part that is provided on the clutch weight and runs on the projection body when displaced to the other end part side of the clutch weight; and a clutch spring that is attached to the clutch weight and acts on force in a direction that separates the other end part side of the clutch weight from the clutch outer part. The projection body and the driven part are formed in a manner that a projection body range between one end part and the other end part in a thickness direction of the clutch weight at a portion where the projection body and the driven part come into contact with each other overlaps an action position in the thickness direction of the clutch weight where force of the clutch spring acts on.

Here, the long hole is a penetration hole or a blind hole that has length in one direction longer than the width direction that intersects with this one direction, and extends long and narrow overall.

According to the centrifugal clutch having the above configuration, the centrifugal clutch is formed in a manner that the projection body range serving as the range between the both end parts in the thickness direction of the clutch weight where the projection body and the clutch weight come into contact with each other overlaps the action position in the thickness direction of the clutch weight where the force of the clutch spring acts on. Therefore, the centrifugal clutch according to the disclosure of the present application suppresses the clutch weight from being inclined to the inside in the radial direction of the drive plate with the projection body as a starting point even if the force from the clutch spring acts on the clutch weight. Therefore, smooth oscillation can be realized and uneven wear of the clutch shoe can be suppressed.

In addition, another feature of the present disclosure is that the spring attachment part where the clutch spring is attached to the clutch weight may be formed on a side of the side plate than a center pail of the thickness direction of the clutch weight.

According to another feature of the present disclosure having the above configuration, in the centrifugal clutch, the spring attachment part of the clutch weight is formed on the side of the side plate than a center part of the thickness direction of the clutch weight. Therefore, the assembly work can be simplified by disposing the clutch spring to the side of the side plate when assembling components of the centrifugal clutch on the drive plate compared with the case in which the clutch spring is disposed on the side of the drive plate.

In addition, another feature of the present disclosure is that the centrifugal clutch may include a projection body support pin that is provided on the drive plate or the side plate in a standing state and supports the projection body by penetrating the projection body; and a positioning body that is disposed between the projection bodies and on the drive plate or the side plate having the projection body support pin provided.

According to another feature of the present disclosure having the above configuration, in the centrifugal clutch, the projection body is supported by being penetrated by the projection body support pin. Further, the position in the axial direction on the projection body support pin can be adjusted by the positioning body. Therefore, by preparing several kinds of positioning bodies having different length in the axial direction (also referred to as "thickness"), the components of the drive plate, the clutch weight, and the projection body support pin can be standardized in the several kinds of centrifugal clutches. Thus, the centrifugal clutch can be configured efficiently.

In addition, another feature of the present disclosure is that in the projection body and the driven part, a center position of the projection body range may agree with the action position of the force of the clutch spring acting on the clutch weight.

According to other feature of the present disclosure having the above configuration, in the centrifugal clutch, the center position of the projection body range agrees with the action position of the force of the clutch spring acting on the clutch weight. Thus, the projection body and the driven part uniformly come into contact in the projection body range; therefore, rising of the clutch weight and uneven wear between both members can effectively be suppressed.

In addition, another feature of the present disclosure is that at least one of the projection body and the driven part may include a roller that is rotatably supported.

According to another feature of the present disclosure having the above configuration, in the centrifugal clutch, at least one of the projection body and the driven part includes a rotatable roller. Therefore, when the projection body and the driven part are pushed to each other, at least one of them including a roller rotates. The frictional sliding between the projection body and the driven part suppresses the increases in the frictional resistance and the damage due to wear. In this case, one of the projection body and the driven part may include a roller and the other may be formed in a plane surface shape or a curved surface shape, or each of the projection body and the driven part may include a roller.

In addition; another feature of the present disclosure is that two or more projection bodies may be provided along the thickness direction of the clutch weight.

According to another feature of the present disclosure having the above configuration, in the centrifugal clutch; two or more projection bodies are provided along the thickness direction of the clutch weight. Therefore, the projection body and the driven part can be brought into contact in a wider range while suppressing the increase in the frictional resistance with the driven part. Thus, the clutch weight can easily be pushed to the side of the clutch outer part more stably.

BRIEF DESCRIPTION OF THE DRAWINGS

FIGS. 4(A) and (B) show an appearance configuration of a projection body of the centrifugal clutch shown in FIG. 1 and FIG. 2, (A) is a partially enlarged perspective view showing a state before the projection body is assembled from outside of the drive plate, (B) is a partially enlarged perspective view showing a state in which the projection body is assembled from outside of the drive plate.

FIGS. 6(A) and (B) show an appearance configuration of the clutch weight of the centrifugal clutch shown in FIG. 1 and FIG. 2, (A) is a perspective view of the clutch weight seen from an upper diagonal direction of FIG. 2, (B) is a perspective view of the clutch weight seen from a lower diagonal direction of FIG. 2.

DESCRIPTION OF THE EMBODIMENTS

Figure 1:
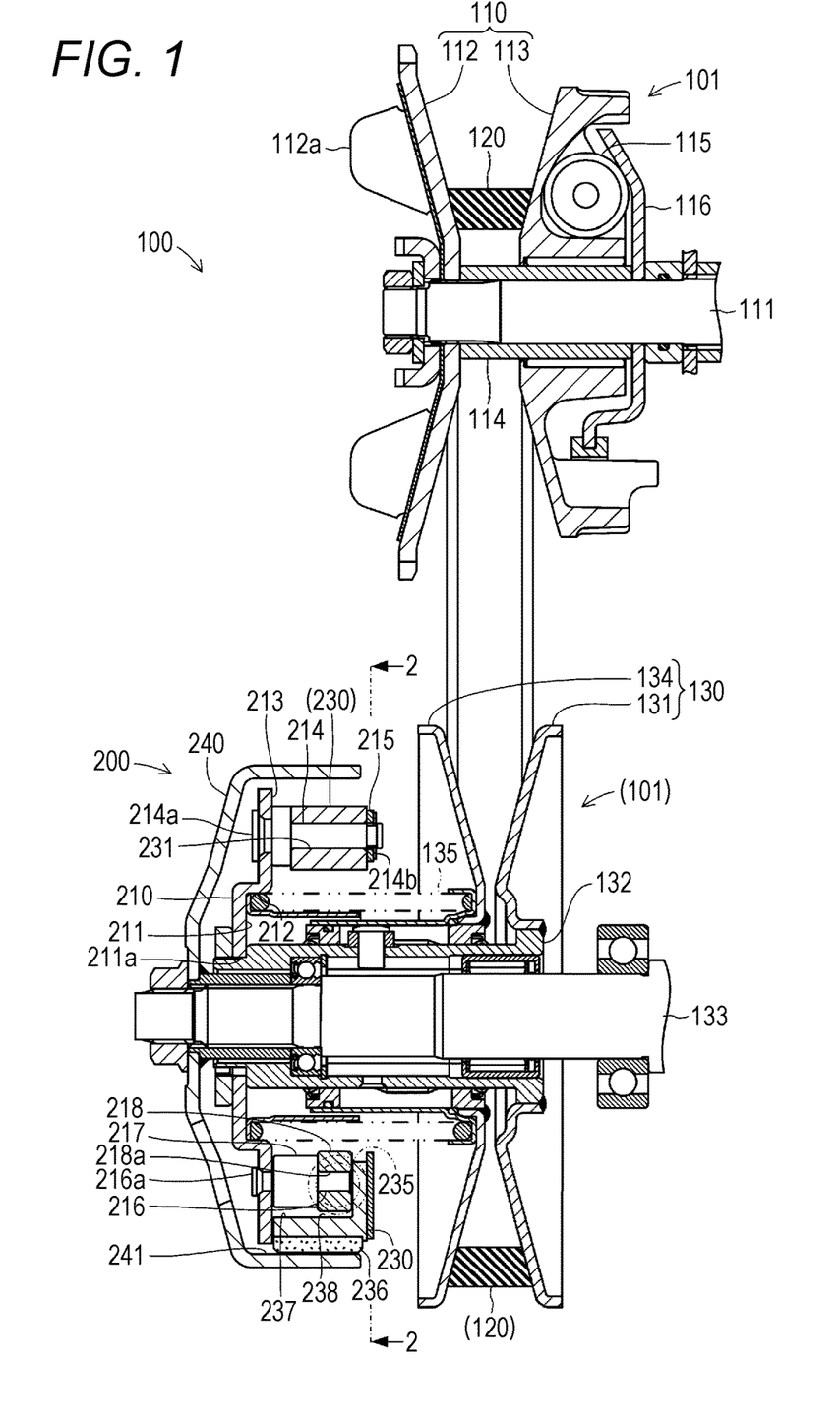
FIG. 1 is a plan sectional view schematically showing a configuration of a power transmission mechanism including a centrifugal clutch according to the present disclosure.
Figure 2:
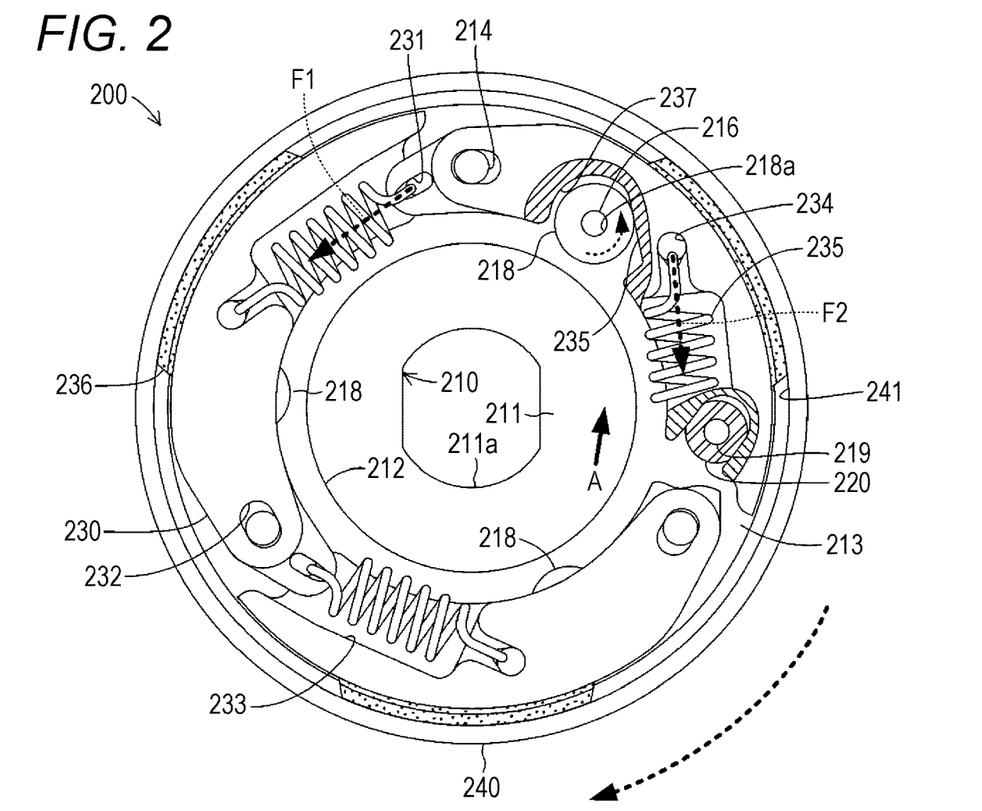
FIG. 2 is a side view showing a state in which a clutch shoe of the centrifugal clutch seen from a line 2-2 shown in FIG. 1 is in contact with a clutch outer part.

An embodiment of the centrifugal clutch according to the present disclosure will be described below with reference to the drawings. FIG. 1 is a plan sectional view schematically showing a configuration of a power transmission mechanism 100 including a centrifugal clutch 200 according to the present disclosure. In addition, FIG. 2 is a side view of the centrifugal clutch 200 seen from the line 2-2 shown in FIG. 1. This power transmission mechanism 100 including the centrifugal clutch 200 is a mechanical device that is provided between the engine and the rear wheel serving as a driving wheel of motorcycles such as scooters mainly to transmit or cut off the rotational driving force with respect to the rear wheel while automatically changing the reduction ratio with respect to the engine rotational speed.

(Configuration of Centrifugal Clutch 200)

The power transmission mechanism 100 mainly includes a transmission 101 and the centrifugal clutch 200. The transmission 101 is a mechanical device that transmits the rotational driving force of the engine that is not shown to the centrifugal clutch 200 by reducing the speed in a stepless manner. The transmission 101 mainly includes a drive pulley 110, a V-belt 120, and a driven pulley 130. Among these components, the drive pulley 110 is a mechanical device that is provided on a crank shaft 111, extending from the engine, and is rotationally driven directly by the rotational driving force of the engine. The drive pulley 110 mainly includes a fixed drive plate 112 and a movable drive plate 113.

The fixed drive plate 112 is a component that is rotationally driven in the state in which the fixed drive plate 112 sandwiches and holds the V-belt 120 with the movable drive plate 113. The fixed drive plate 112 includes a metal material formed into a conical tubular shape. The fixed drive plate 112 is fixedly attached on the crank shaft 111 in the state in which the surface on the convex side faces the side of the movable drive plate 113 (engine side). That is, the fixed drive plate 112 is rotationally driven integrally with the crank shaft 111 constantly. In addition, on the surface on the concave side of the fixed drive plate 112, a plurality of heat radiation fins 112a is provided radially around the axis of the crank shaft 111.

The movable drive plate 113 is a component that is rotationally driven in the state in which the movable drive plate 113 sandwiches and holds the V-belt 120 with the fixed drive plate 112. The movable drive plate 113 includes a metal material formed into a conical tubular shape. The movable drive plate 113 is attached on the crank shaft 111 in the state in which the surface on the convex side faces the fixed drive plate 112. In this case, the movable drive plate 113 is attached on a sleeve bearing 114 that is fixedly fitted to the crank shaft 111 via an impregnation bush. The movable drive plate 113 is attached slidably in the axial direction and the circumferential direction with respect to the sleeve bearing 114.

On the other hand, a plurality of roller weights 115 is provided on the surface on the concave side of the movable drive plate 113 in the state in which the roller weights 115 are pressed by a ramp plate 116. The roller weight 115 is a component for pressing the movable drive plate 113 to the side of the fixed drive plate 112 together with the ramp plate 116 by being displaced to the outside in the radial direction in accordance with the increase in the rotational speed of the movable drive plate 113. The roller weight 115 includes a metal material formed into a tubular shape. In addition, the ramp plate 116 is a component for pressing the roller weight 115 to side of the movable drive plate 113. The ramp plate 116 is formed by bending a metal plate to the side of the movable drive plate 113.

The V-belt 120 is a component for transmitting the rotational driving force of the drive pulley 110 to the driven pulley 130. The V-belt 120 is formed in an endless ring shape having core wire covered with a resin material. The V-belt 120 is disposed between the fixed drive plate 112 and the movable drive plate 113 and between a fixed driven plate 131 and a movable driven plate 134 of the driven pulley 130, and installed between the drive pulley 110 and the driven pulley 130.

The driven pulley 130 is a mechanical device that is rotationally driven by the rotational driving force of the engine transmitted via the drive pulley 110 and the V-belt 120. The driven pulley 130 mainly includes the fixed driven plate 131 and the movable driven plate 134.

The fixed driven plate 131 is a component that is rotationally driven in the state in which the fixed driven plate 131 sandwiches and holds the V-belt 120 with the movable driven plate 134. The fixed driven plate 131 includes a metal material formed into a conical tubular shape. The fixed driven plate 131 is fixedly attached to a driven sleeve 132 in the state in which the surface on the convex side faces the side of the movable driven plate 134.

The driven sleeve 132 is a metal tubular component that is rotationally driven integrally with the fixed driven plate 131. The driven sleeve 132 is attached to a drive shaft 133 via a bearing in a relatively rotatable state. The drive shaft 133 is a metal rotating shaft body for rotating the rear wheel of the motorcycle mounted with this power transmission mechanism 100 via a transmission that is not shown. In this case, the rear wheel of the motorcycle is attached to one (right side in the figure) end part of the drive shaft 133.

The movable driven plate 134 is a component that is rotationally driven in the state in which the movable driven plate 134 sandwiches and holds the V-belt 120 with the fixed driven plate 131. The movable driven plate 134 includes a metal material formed into a conical tubular shape. The movable driven plate 134 is slidably fitted with respect to the driven sleeve 132 in the axial direction in the state in which the surface on the convex side faces the fixed driven plate 131.

On the other hand, on the surface on the concave side of the movable driven plate 134, a torque spring 135 is provided between this surface and a drive plate 210 of the centrifugal clutch 200. The torque spring 135 is a coil spring that elastically presses the movable driven plate 134 to the side of the fixed driven plate 131. That is, the transmission 101 changes the engine rotational speed in a stepless manner in accordance with the magnitude correlation between the diameter sandwiching the V-belt 120 that is defined by the interval between the fixed drive plate 112 and the movable drive plate 113 and the diameter sandwiching the V-belt 120 that is defined by the interval between the fixed driven plate 131 and the movable driven plate 134. In addition, the centrifugal clutch 200 is provided on tip end part sides of the driven sleeve 132 and the drive shaft 133.

The centrifugal clutch 200 is a mechanical device that transmits or cuts off the rotational driving force of the engine transmitted via the transmission 101 respect to the drive shaft 133. The centrifugal clutch 200 mainly includes the drive plate 210, three clutch weights 230, and a clutch outer part 240.

Figure 3:
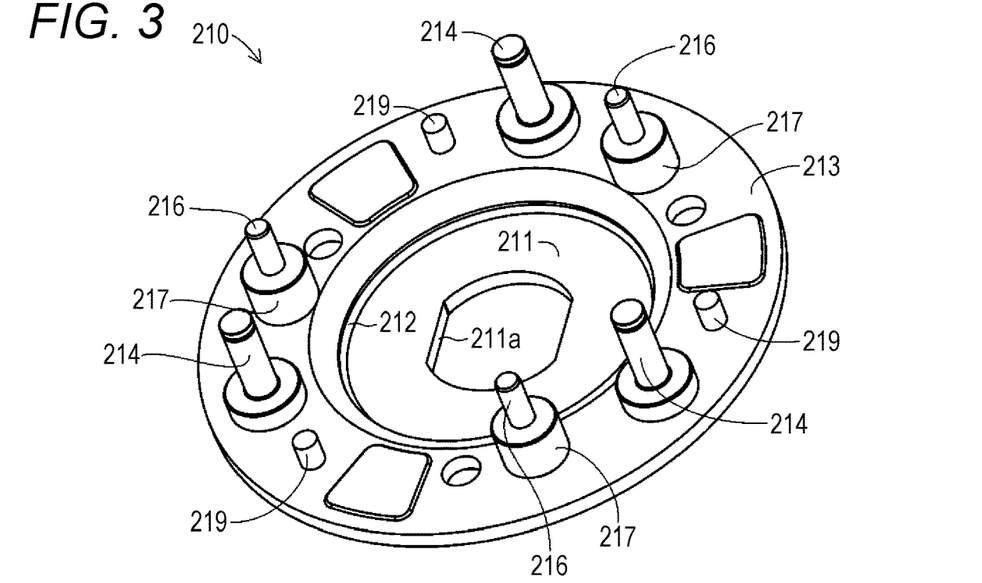
FIG. 3 is a perspective view schematically showing an appearance configuration of a drive plate of the centrifugal clutch shown in FIG. 1 and FIG. 2.

The drive plate 210 is a component that is rotationally driven integrally with the driven sleeve 132. The drive plate 210 includes a metal material formed into a stepped disk shape. More specifically, as shown in FIG. 3, the drive plate 210 has a penetration hole 211a, through which the driven sleeve 132 penetrates, formed at the center part of a planar bottom part 211. In addition, a flange part 213 projecting in a flange shape is formed at the tip end part of a tubular part 212 standing around the bottom part 211. At the flange part 213, three oscillation support pins 214, projection body support pins 216, and damper receiving pins 219 are provided at equal intervals along the circumferential direction.

The oscillation support pin 214 is a component for rotatably supporting one end part side of the clutch weight 230 to be described later and oscillating the other end part side. The oscillation support pin 214 includes a stepped rod body made of metal. In this case, the oscillation support pin 214 includes a material that is unlikely to cause friction compared with the material of the inner peripheral surface of a pin slide hole 232 of the clutch weight 230. Specifically, the oscillation support pin 214 includes a carbon steel or iron-based sintered material. The oscillation support pin 214 is fixedly attached to the flange part 213 by an attachment bolt 214a. The oscillation support pin 214 supports the clutch weight 230 in a sandwiching state via an E-ring 214h attached at the tip end part of the oscillation support pin 214 and a side plate 215 disposed between the E-ring 214b and the clutch weight 230.

The side plate 215 is a component for pressing the three clutch weights 230. The side plate 215 includes a metal material formed into a ring shape having a substantially same size as the flange part 213. With respect to the three clutch weights 230, the side plate 215 is disposed in the state facing the clutch weights 230 on the opposite side of the drive plate 210.

Figure 4:
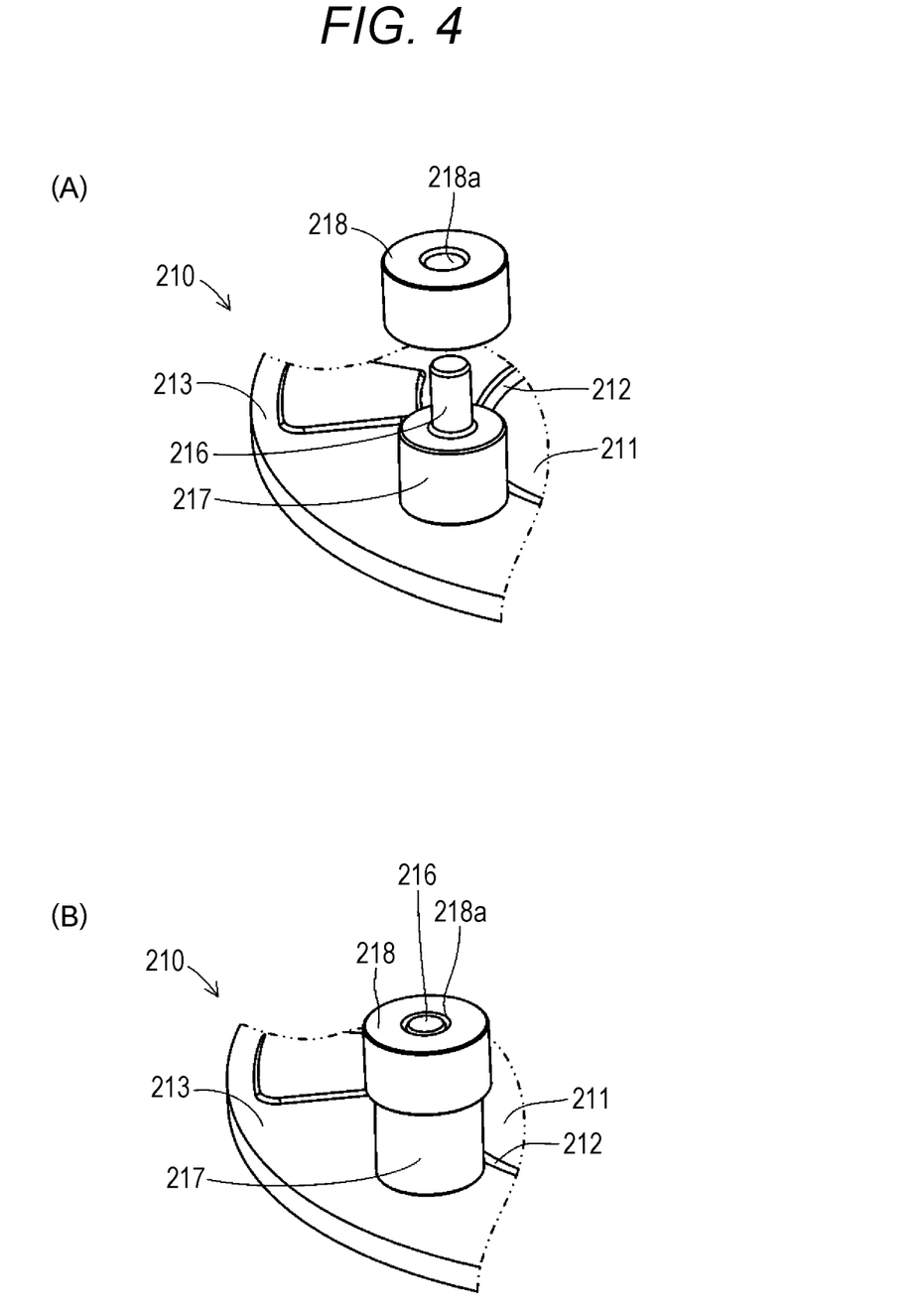

As shown in FIGS. 4(A) and (B), the projection body support pin 216 is a component for supporting a projection body 218 in a rotatable state. The projection body support pin 216 includes a metal (for example, carbon steel) rod body. The respective projection body support pins 216 are fixedly attached by attachment bolts 216a in a standing state on the flange part 213 facing the portion that is on the tip side (the side of the damper receiving pin 219) of the clutch weight 230 than the pin slide hole 232 of the clutch weight 230. In addition, respective positioning bodies 217 and projection bodies 218 are fitted to the projection body support pins 216.

The positioning body 217 is a component that defines and supports the position of the projection body 218 on the axis of the projection body support pin 216. The positioning body 217 includes a metal (for example, carbon steel) tubular body into which the projection body support pin 216 fits. More specifically, the positioning body 217 is formed to have an inner diameter with fit tolerance that allows the projection body support pin 216 to be press fit or slide. Further, the positioning body 217 is formed to have an outer diameter that is smaller than the outer diameter of the projection body 218. In addition, the positioning body 217 is formed in a manner that the length (thickness) in the axial direction locates the projection body 218 at a position that is same as the positions of a first spring attachment part 231 and a second spring attachment part 234 of the clutch weight 230 in the thickness direction of the clutch weight 230.

The projection body 218 is a component for pressing the clutch weight 230 to the side of the clutch outer part 240. The projection body 218 includes a metal material (for example, carbon steel or an iron-based sintered material) formed into a tubular shape. More specifically, the projection body 218 has a penetration hole 218a, through which the projection body support pin 216 penetrates, formed at the center part of the cylindrical body. In this case, the penetration hole 218a is formed to have an inner diameter that can rotate and slide with respect to the projection body support pin 216, that is, dimensional tolerance serving as a so-called clearance fit with respect to the projection body support pin 216. The projection body 218 is provided for every clutch weight 230.

Figure 5:
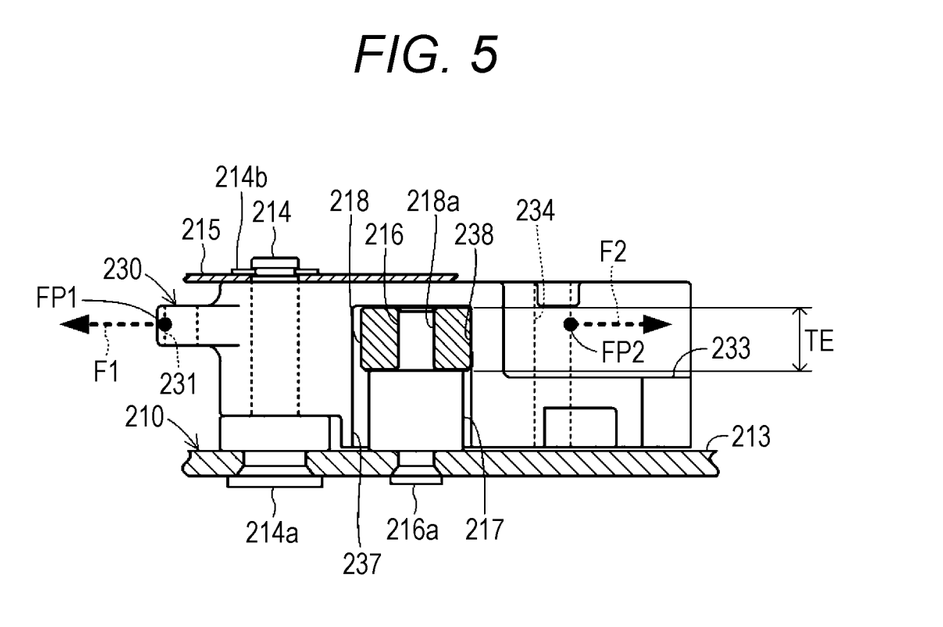
FIG. 5 is a partially broken side view showing a configuration of a clutch weight and the projection body of the centrifugal clutch seen from an arrow line A shown in FIG. 2.

In this case, as illustrated in FIG. 5, each of the projection bodies 218 are disposed at such a position that allows a projection body range IF of the portion where the projection body 218 and a driven part 238 to be described later comes into contact with each other in the thickness direction of the clutch weight 230 overlaps action positions FP1 and FP2 of forces F1 and F2 of a clutch spring 235 acting on the clutch weight 230 in the thickness direction of the clutch weight 230. In the present embodiment, the positioning body 217 that is held by the projection body support pin 216 defines the position of the projection bodies 218 in the thickness direction of the clutch weight 230. In FIG. 5, the forces F1 and F2 of the clutch spring 235 acting on the clutch weight 230 are shown by dotted line arrows.

The damper receiving pin 219 is a component for supporting a damper 220. The damper receiving pin 219 includes a metal rod body. The damper 220 is a component that guides the oscillation motion of the other end part side of the clutch weight 230 that approaches or become separated with respect to the clutch outer part 240 and also serves as a buffer material at the time of separation. The damper 220 includes a rubber material formed into a tubular shape. The damper 220 is fixedly fitted on the outer peripheral surface of the damper receiving pin 219.

Figure 6:
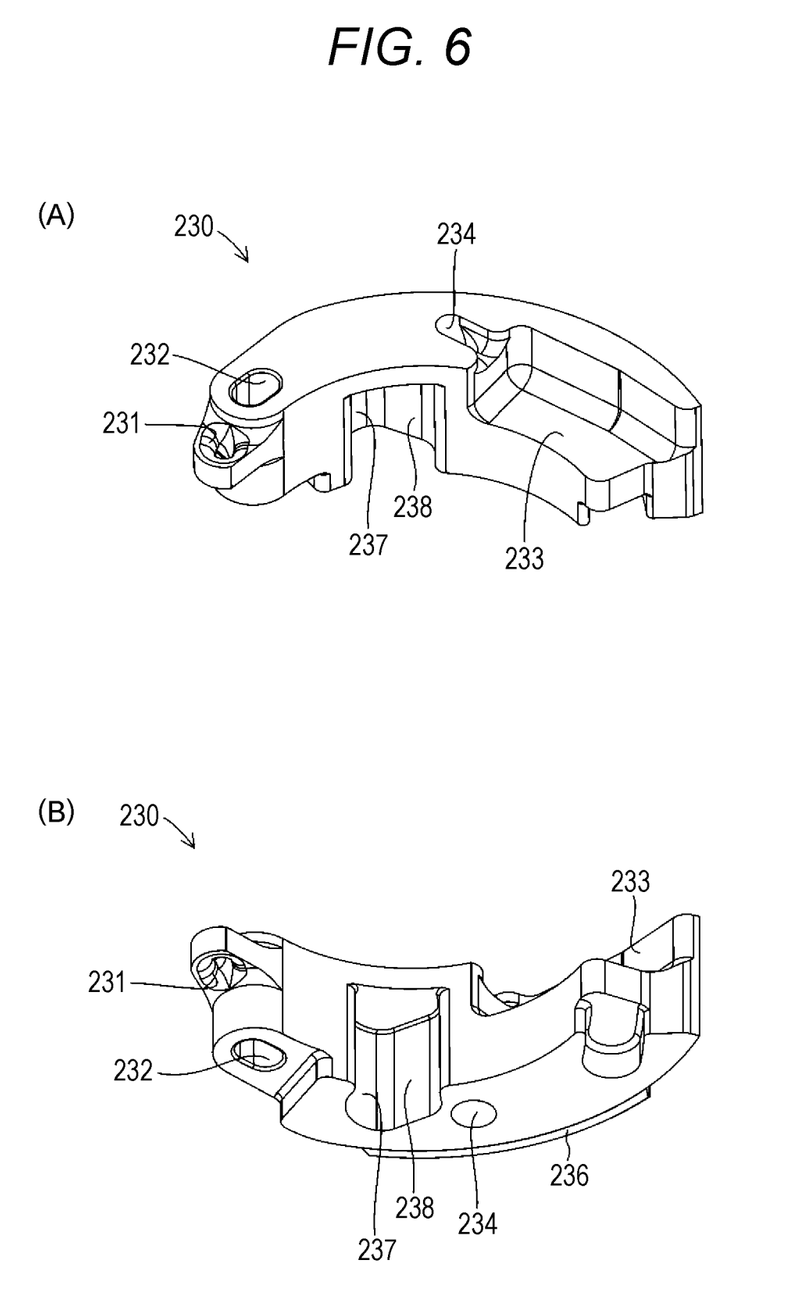

As shown in FIGS. 6(A) and (B), three clutch weights 230 are components for transmitting or cutting off the rotational drive force of the engine with respect to the drive shaft 133 by coming into contact with or become separated from the clutch outer part 240 via a clutch shoe 236 in accordance with the rotational speed of the drive plate 210. The clutch weight 230 includes a metal material (for example, a zinc material) formed into a curved shape that extends in the circumferential direction of the drive plate 210.

The clutch weights 230 each have a one (left side) end part side having the first spring attachment part 231 and the pin slide hole 232 formed, and the other (right side in the figure) end part side having a spring storage part 233 formed. The first spring attachment part 231 is a part for connecting one end part of the clutch spring 235 installed between the clutch weights 230 that are adjacent to each other on the one end part side. The first spring attachment part 231 includes a penetration hole formed at one (left side) end part of the clutch weight 230. In this case, the first spring attachment part 231 is formed on the side of the side plate 215 than the center part in the thickness direction of the clutch weight 230.

The pin slide hole 232 is a part where the oscillation support pin 214 in the drive plate 210 is rotatably and slidably fitted. The pin slide hole 232 includes a penetration hole that penetrates in the thickness direction of the clutch weight 230 at a position adjacent to the first spring attachment part 231. The pin slide hole 232 is formed in a long hole shape in a manner that the clutch weight 230 is displaced to the rear side of the rotational driving direction of the drive plate 210 when the clutch shoe 236 comes into contact with the clutch outer part 240.

In this case, the long hole of the pin slide hole 232 is formed in a manner that the length in one direction becomes longer than the width direction that intersects with this one direction and to extend long and narrow overall. More specifically, the pin slide hole 232 is formed in a manner that the width direction serving as the radial direction of the drive plate 210 has an inner diameter having a clearance fit size that is slightly larger than the outer diameter of the oscillation support pin 214. On the other hand, the longitudinal direction of the pin slide hole 232 is formed to extend in an arc shape or a straight line in a direction that allows the displacement of the clutch weight 230 to the side where nm-on is further facilitated when the driven part 238 of the clutch weight 230 is strongly pushed to the projection body 218.

In the present embodiment, the pin slide hole 232 is formed to extend in an arc shape to the front side of the rotational driving direction of the drive plate 210. In this case, the pin slide hole 232 in the present embodiment is concentric to the drive plate 210; however, the pin slide hole 232 does not have to be concentric to the drive plate 210.

The spring storage part 233 is a part for storing the clutch spring 235 installed between the clutch weights 230 that are adjacent to each other on the other end part side on the opposite side of the first spring attachment part 231. The spring storage part 233 is formed to be recessed in a concave shape. The second spring attachment part 234 is formed at the end part of the spring storage part 233 on the side of the pin slide hole 232. The second spring attachment part 234 is a part for connecting one end part of the clutch spring 235 stored in the spring storage part 233. The second spring attachment part 234 includes a penetration hole. The second spring attachment part 234 is formed at substantially the same position as the first spring attachment part 231 in the thickness direction of the clutch weight 230.

The clutch spring 235 is a component for acting the force F2 in the direction that separates the other end part side of the clutch weight 230 from the clutch outer part 240. The clutch spring 235 includes a metal coil spring. The clutch spring 235 is installed between the clutch weights 230 that are adjacent to each other along the circumferential direction of the drive plate 210. More specifically, one of both end parts of the clutch spring 235 is hooked on the first spring attachment part 231 of the clutch weight 230. Further, the other end is hooked on the second spring attachment part 234 of the clutch weight 230 that is adjacent to the clutch weight 230 having the first spring attachment part 231 formed.

That is, in each of the clutch weights 230, in the state in which one end part side is rotatably supported by the oscillation support pin 214 via the pin slide hole 232, both end parts in the circumferential direction of the drive plate 210 are connected by the two clutch springs 235 that are installed between the clutch weights 230 adjacent to each other. Thus, each of the clutch weights 230 oscillates in the reciprocating direction that allows the other end pail side to approach or become separated with respect to the clutch outer part 240 in the state in which the clutch weights 230 are pulled to the inside direction of the drive plate 210 by the tensile forces F1 and F2 of the two clutch springs 235.

In FIG. 2, to clearly show the configuration of the clutch weight 230, two places of one of the three clutch weights 230 are shown by breaking the surface in different thickness directions, in addition, the E-ring 214*b* and the side plate 215 are omitted in FIG. 2. In addition, the directions in which the drive plate 210 and the clutch outer part 240 of the centrifugal clutch 200 are rotationally driven are shown by a dotted line arrow in FIG. 2. In addition, the forces F1 and F2 of the clutch spring 235 acting on the clutch weight 230 are shown by dotted line arrows in FIG. 2.

The clutch shoe 236 is a component for increasing the friction force with respect to the inner peripheral surface of the clutch outer part 240. The clutch shoe 236 includes a friction material formed into a plate shape extending in an arc shape. The clutch shoe 236 is provided along the outer peripheral surface on the opposite side of the pin slide hole 232 of each of the clutch weights 230.

In addition, at a part of the inner peripheral surface of the clutch weights 230 that faces the projection body 218 of the drive plate 210, a projection body relief part 237 recessed into a concave shape to cover the projection body 218 is formed. A part of the inner peripheral portion of the projection body relief parts 237 has the driven part 238 that is in contact with the projection body 218 constantly formed. Further, the remaining portion is cut out in an arc shape not to come into contact with the projection body 218.

The driven part 238 is a part for displacing the clutch weight 230 to the side of the clutch outer part 240 together with the projection body 218. The driven part 238 includes a flat inclined surface facing the projection body 218. More specifically, the driven part 238 is formed to extend while being inclined toward the rear side and outside of the rotational driving direction of the drive plate 210. The thickness of the driven part 238 is formed to be wider than the wall thickness of the projection body 218. In addition, the driven part 238 includes a material that is easily worn compared with the projection body 218, in the present embodiment, the driven part 238 includes the same metal material (for example, a zinc material) as the clutch weight 230.

The clutch outer part 240 is a component that is rotationally driven integrally with the drive shaft 133. The clutch outer part 240 includes a metal material formed into a cup shape that covers the outer peripheral surface from the drive plate 210 to the clutch weight 230. That is, the clutch outer part 240 formed to include a tubular surface 241 that comes into friction contact with the clutch shoe 236 of the clutch weight 230 displaced on the outer peripheral side of the drive plate 210.

(Operation of Centrifugal Clutch 200)

Figure 7:
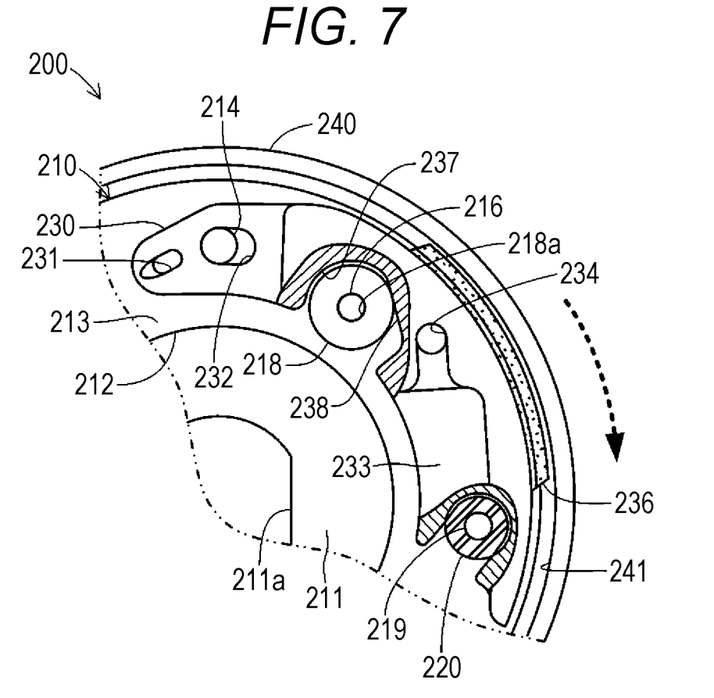
FIG. 7 is a partially enlarged view showing a state in which the clutch shoe of the centrifugal clutch shown in FIG. 2 is not in contact with the clutch outer part.

Next, the operation of the centrifugal clutch 200 having the above configuration will be described. The centrifugal clutch 200 functions by forming a part of the power transmission mechanism 100 disposed between the engine and the rear wheel serving as a driving wheel of an automatic motorcycle (for example, a scooter). First, as shown in FIG. 7, the centrifugal clutch 200 cuts off the transmission of the driving force between the engine and the drive shaft 133 when the engine is in an idling state. Specifically, in the centrifugal clutch 200, the rotational driving force of the engine transmitted via the transmission 101 rotationally drives the drive plate 210, rotationally driving the clutch weight 230.

However, in this case, in the centrifugal clutch 200, the centrifugal force acting on the clutch weight 230 is smaller than the force F2, which is the elastic force (tensile force) of the clutch spring 235. Therefore, the clutch shoe 236 does not come into contact with the tubular surface 241 of the clutch outer part 240, and the rotational driving force of the engine is not transmitted to the drive shaft 133. In addition, the clutch weight 230 maintains the state in which the driven part 238 is pushed to come into contact with the roller surface of the projection body 218 by the forces F1 and F2, which are the elastic forces (tensile forces) of the clutch spring 235.

That is, the clutch weight 230 is in a state closed to the inside in the radial direction of the drive plate 210 by the two clutch springs 235. In this case, the clutch weight 230 is at a position slid to the front side of the rotational driving direction of the drive plate 210 by the long hole-shaped pin slide hole 232. However, in this case, the pin slide hole 232 is formed in a long hole shape; therefore, the clutch weight 230 can be displaced in the circumferential direction of the drive plate 210 within the range of the long hole. Therefore, the clutch weight 230 can be inclined to the inside in the radial direction of the drive plate 210 by the forces F1 and F2 of the two clutch springs 235.

However, the clutch weight 230 is formed in a manner that the projection body range TE between one (upper side in FIG. 5) end part and the other (lower side in FIG. 5) end part in the thickness direction of the clutch weight 230 at a portion where the projection body 218 and the driven part 238 come into contact with each other overlaps the action positions FP1 and FP2 of the forces F1 and F2 of the clutch spring 235 acting on the clutch weight 230 in the thickness direction of the clutch weight 230. Thus, the driven part 238 is pushed by substantially uniform pressure with respect to the projection body 218 in the thickness direction of the clutch weight 230. Therefore, the clutch weight 230 keeps a standing attitude in the vertical direction with respect to the drive plate 210 without becoming inclined to the inside in the radial direction with the projection body 218 as a starting point.

In addition, in FIG. 7, the E-ring 214*b*, the side plate 215, and the clutch spring 235 are omitted. In addition, the direction in which the drive plate 210 of the centrifugal clutch 200 is rotationally driven is shown by a dotted line arrow in FIG. 7.

Next, the centrifugal clutch 200 transmits the rotational driving force of the engine to the drive shaft 133 in accordance with the increase in the engine rotational speed by the accelerator operation by the driver of the automatic motorcycle. Specifically, in the centrifugal clutch 200, the centrifugal force acting on the clutch weight 230 becomes larger than the force F2 of the clutch spring 235 as the engine rotational speed increases as shown in FIG. 2. Therefore, the clutch weight 230 is rotationally displaced toward the outside in the radial direction with the oscillation support pin 214 as a center.

That is, in the centrifugal clutch 200, the clutch weight 230 is rotationally displaced to the side of the tubular surface 241 of the clutch outer part 240 while resisting the force F2 of the clutch spring 235 as the engine rotational speed increases. As a result, the clutch shoe 236 comes into contact with the tubular surface 241. In this case, the clutch weight 230 keeps a standing attitude in the vertical direction with respect to the drive plate 210 as described above. Therefore, the clutch shoe 236 comes into contact with the tubular surface 241 keeping the parallel state.

When the clutch shoe 236 comes into contact with the tubular surface 241, the clutch weight 230 receives counterforce that is in the direction opposite from the rotational driving direction via the clutch shoe 236 as shown in FIG. 7. In this case, the pin slide hole 232 is formed in a long hole shape along the circumferential direction of the drive plate 210, and the oscillation support pin 214 is located at the rear side end part of the pin slide hole 232 in the rotational driving direction of the drive plate 210. That is, the clutch weight 230 is in a state in which displacement to the rear side of the rotational driving direction of the drive plate 210 is allowed. Therefore, the clutch weight 230 is relatively displaced in the direction opposite from the rotational driving direction of the drive plate 210 by the counterforce received via the clutch shoe 236.

Thus, the driven part 238 formed on the clutch weight 230 is strongly pushed to the projection body 218. In this case, the projection body 218 is rotatably supported with respect to the projection body support pin 216; therefore, the projection body 218 rotates in the counter clockwise direction shown in the figure by being pushed by the driven part 238. Thus, in the clutch weight 230, the driven part 238 runs on the projection body 218 while rotationally displacing the projection body 218. In accordance with this, the clutch shoe 236 is pushed to the tubular surface 241 by being pushed to the side of the clutch outer part 240 at the outside in the radial direction.

As a result, the clutch shoe 236 is pushed to the tubular surface 241 in a short time (instantaneously in other words) after the clutch shoe 236 comes into contact with the tubular surface 241 of the clutch outer part 240. Thus, the centrifugal clutch 200 comes in to a connected state in which the rotational driving force of the engine is completely transmitted to the drive shaft 133. That is, the clutch weight 230 gets in between the projection body 218 and the clutch outer part 240 in a wedge-like state.

In the centrifugal clutch 200 in a connected state, the clutch shoe 236 maintains the state in which the clutch shoe 236 is pushed to the tubular surface 241 of the clutch outer part 240. Therefore, the drive plate 210 and the clutch outer part 240 are rotated and driven integrally. Thus, the automatic motorcycle can run when the rear wheel is rotationally driven by the rotational driving force of the engine.

On the other hand, the centrifugal clutch 200 cuts off the transmission of the rotational driving force of the engine to the drive shaft 133 when the engine rotational speed decreases. Specifically, in the centrifugal clutch 200, the centrifugal force acting on the clutch weight 230 becomes smaller than the force F2 of the clutch spring 235 as the engine rotational speed decreases. Therefore, the clutch weight 230 is rotationally displaced toward the inside in the radial direction with the oscillation support pin 214 as a center.

In this case, the pin slide hole 232 is formed in a long hole shape along the circumferential direction of the drive plate 210, and the oscillation support pin 214 is located near the front side end part of the pin slide hole 232 in the rotational driving direction of the drive plate 210. That is, the clutch weight 230 is in a state in which displacement to the front side of the rotational driving direction of the drive plate 210 is allowed. Therefore, the clutch weight 230 is relatively and rotationally displaced with respect to the drive plate 210 toward the front direction of the rotational driving direction of the drive plate 210 by the force F2 of the clutch spring 235. In this case, the clutch weight 230 is displaced while the driven part 238 rotationally displaces the projection body 218 in the clockwise direction in shown in the figure.

Thus, the clutch weight 230 returns to the original position (position at the time of idling). That is, the centrifugal clutch 200 is in a disconnected state in which the clutch shoe 236 is not in contact with the clutch outer part 240 and the rotational driving force is not transmitted. In this case, as described above, the projection body range TE where the projection body 218 and the driven part 238 come into contact with each other is formed at a position overlapping the action positions FP1 and FP2 of the forces F1 and F2 of the clutch spring 235 acting on the clutch weight 230 in the thickness direction of the clutch weight 230. Therefore, the clutch weight 230 keeps a standing attitude in the vertical direction with respect to the drive plate 210 without being inclined to the inside in the radial direction with the projection body 218 as a starting point.

As explained in the above operation description, according to the above embodiment, the centrifugal clutch 200 is formed in a manner that the projection body range TE serving as the range between the both end parts in the thickness direction of the clutch weight 230 where the projection body 218 and the clutch weight 230 come into contact with each other overlaps the action positions FP1 and FP2 in the thickness direction of the clutch weight 230 where forces F1 and F2 of the clutch spring 235 acts on. Therefore, the centrifugal clutch 200 according to the disclosure of the present application suppresses the clutch weight 230 from being inclined to the inside in the radial direction of the drive plate 210 with the projection body 218 as a starting point even if the forces F1 and F2 from the clutch spring 235 acts on the clutch weight 230. Thus, smooth oscillation can be realized and uneven wear of the clutch shoe 236 can be suppressed.

Furthermore, the practice of the present disclosure is not limited to the above embodiment, and various modifications can be made without departing from the object of the present disclosure. In the following modified examples, configurations that are similar to that of the above embodiment will be provided with the same reference numerals and the description thereof will be omitted.

For example, in the above embodiment, the position and the length (thickness) in the axial direction of the portion where the projection body 218 comes into contact with the driven part 238 is defined as the projection body range TE. In addition, the projection body 218 and the driven part 238 are disposed in a manner that the projection body range TE overlaps the action positions FP1 and FP2 of the forces F1 and F2 of the clutch spring 235 acting on the clutch weight 230 in the thickness direction of the clutch weight 230. However, the projection body 218 and the driven part 238 just have to be formed in a manner that the projection body range TE between one end part (upper side in FIG. 5) and the other end part (lower side in FIG. 5) in the thickness direction of the clutch weight 230 at the portion where the projection body 218 and the driven part 238 come into contact with each other overlaps the action positions FP1 and FP2 of the forces F1 and F2 of the clutch spring 235 acting on the clutch weight 230 in the thickness direction of the clutch weight 230.

Figure 8:
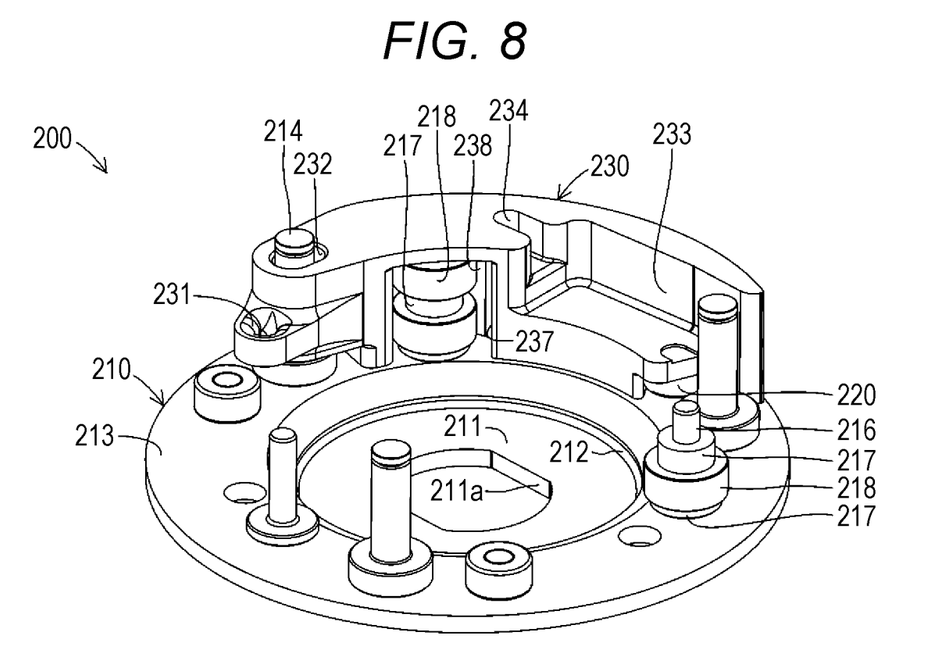
FIG. 8 is a perspective view showing an appearance configuration of a drive plate, an oscillation support pin, a projection body support pin, a projection body, a positioning body, and a clutch weight of a centrifugal clutch according to an embodiment of the present disclosure.
Figure 9:
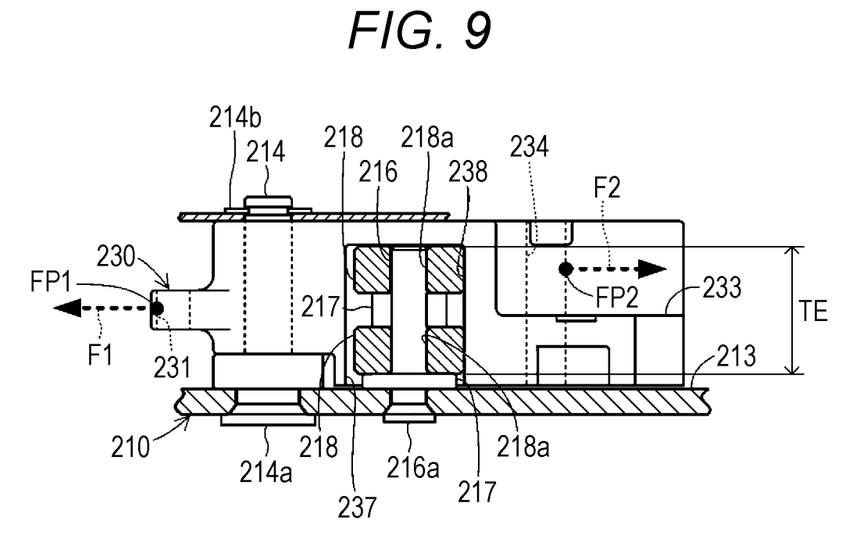
FIG. 9 is a partially broken side view showing a configuration of the clutch weight and the projection body of the centrifugal clutch shown in FIG. 8 from a view that is similar to FIG. 5.

Therefore, when two projection bodies 218 are provided on one projection body support pin 216 as shown in FIG. 8 and FIG. 9 for example, the projection body range TE may preferably be defined as the range between the upper end part of the projection body 218 on the side of the side plate 215 (upper side in the figure) and the lower end part of the projection body 218 on the side of the drive plate 210 (lower side in the figure) of the two projection bodies 218, and the projection body 218 and the driven part 238 may preferably be disposed in a manner that the projection body range TE overlaps the action positions FP1 and FP2 of the forces F1 and F2 in the thickness direction of the clutch weight 230.

In this case, the two projection bodies 218 can be disposed separately by disposing the positioning body 217 between the two projection bodies 218. Therefore, compared with the case in which one projection body 218 is formed long, the projection body 218 and the driven part 238 can come into contact in a wider range while suppressing the increase in the frictional resistance with the driven part 238. Thus, the centrifugal clutch 200 can push the clutch weight 230 to the side of the clutch outer part 240 more stably. Three or more projection bodies 218 may be provided on one projection body support pin 216. In addition, FIG. 8 shows the state in which one clutch weight 230 is assembled on the drive plate 210 and the projection body support pin 216, the positioning body 217, and the projection body 218 are assembled with respect to the one clutch weight 230.

In addition, when two first spring attachment parts 231 and second spring attachment parts 234 are provided with respect to one clutch weight 230 in the thickness direction of the clutch weight 230, the projection body 218 and the driven part 238 may preferably be disposed in a manner that the projection body range TE overlaps action positions FP1 and FP2, in the thickness direction of the clutch weights 230, of resultant force F1 of the respective clutch springs 235 attached to the two first spring attachment parts 231 and resultant force F2 of the respective clutch springs 235 attached to the two second spring attachment parts 234.

In addition, in these cases, in the projection body 218 and the driven part 238, the center position of the projection body range TE may preferably agree with the action positions FP1 and FP2 of the forces F1 and F2 of the clutch spring 235 acting on the clutch weight 230 in the thickness direction of the clutch weight 230.

In addition, in the above embodiment, the clutch weight 230 is configured in a manner that the first spring attachment part 231 and the second spring attachment part 234 are formed on the side of the side plate 215 than the center part in the thickness direction of the clutch weight 230. However, the clutch weight 230 may also be configured in a manner that the first spring attachment part 231 and the second spring attachment part 234 are formed at the center part in the thickness direction of the clutch weight 230 or on the side of the drive plate 210 than the center part.

In addition, in the above embodiment, the positioning body 217 includes a body that is different from the projection body 218. However, the positioning body 217 just has to be configured in a manner that the position of the clutch weight 230 in the thickness direction on the projection body support pin 216 can be define. Therefore, the positioning body 217 may integrally be formed with the projection body support pin 216 or may integrally be formed with the projection body 218.

Figure 10:
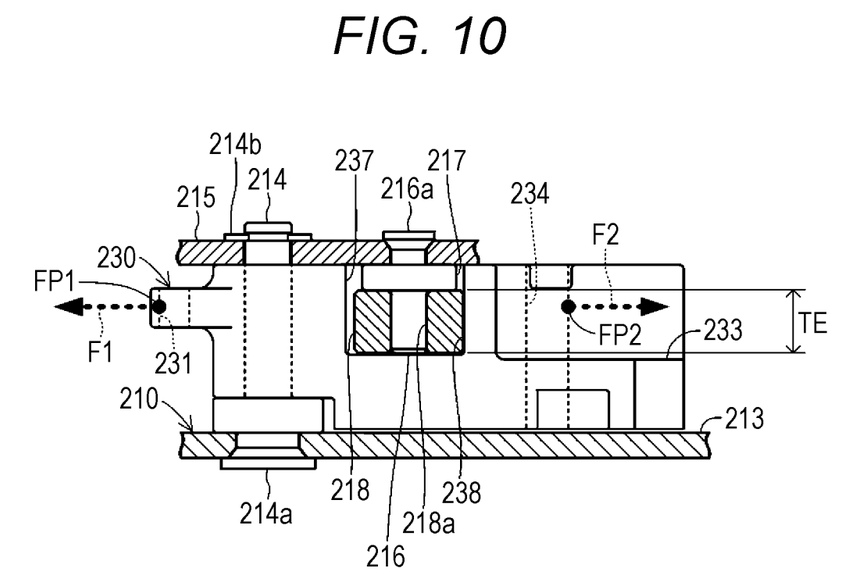
FIG. 10 is a partially broken side view showing a configuration of a clutch weight and a projection body of a centrifugal clutch according to another embodiment of the present disclosure from a view that is similar to FIG. 5.

In addition, in the above embodiment, the projection body support pin 216 of the centrifugal clutch 200 is provided on the drive plate 210. However, in the centrifugal clutch 200, the projection body support pin 216 may be provided on the side plate 215 as shown in FIG. 10 for example. This allows performing maintenance of the projection body 218 by removing the side plate 215 of the centrifugal clutch 200. Therefore, the workability of the maintenance work can be improved.

In addition, in the above embodiment, the pin slide hole 232 includes an arc-shaped penetration hole. However, the pin slide hole 232 just has to be formed in a long hole that allows displacement of the clutch weight 230 to the rear side of the rotational driving direction of the drive plate 210 in the state in which the clutch shoe 236 of the clutch weight 230 become separated from the tubular surface 241 of the clutch outer part 240 the most. Thus, the pin slide hole 232 is not necessarily limited to the above embodiment.

Therefore, the pin slide hole 232 can be formed in a straight line extending in the tangent direction that intersects with the radial direction of the drive plate 210. In addition, the pin slide hole 232 can include a so-called blind hole having one end opened and the other end closed.

In addition, in the above embodiment, the projection body 218 is rotatably attached on the drive plate 210. However, the projection body 218 may fixedly attached on the drive plate 210, or the projection body 218 may integrally formed with the same material with respect to the drive plate 210. When the projection body 218 is integrally formed with the same material with respect to the drive plate 210, the projection body 218 may preferably include a curved surface including an arc surface with one curvature or two or more curvatures in the range where the driven part 238 slides. In addition, the number of the projection body 218 and the driven part 238 provided for each of the drive plate 210 and the clutch weight 230 just has to be one, that is, one pair or more.

In addition, in the above embodiment, the projection body 218 includes a roller. However, the projection body 218 just has to be formed to project to the outside from the outer peripheral part of the drive plate 210 and formed in a shape that pushes out the clutch weight 230 to the outside via the driven part 238. That is, at least one of the projection body 218 and the driven part 238 just has to be formed to extend to the outside of the drive plate 210 toward the rear side of the rotational driving direction of the drive plate 210. In this case, in the projection body 218 and the driven part 238, a part that heads toward the rear side of the rotational driving direction of the drive plate 210 and extends to the outside of the drive plate 210 just has to be formed at all or part of the projection body 218 and the driven part 238. Therefore, the projection body 218 may form a metal material (for example, carbon steel or an iron-based sintered material) into a plate shape.

In addition, in the above embodiment, two clutch springs 235 are attached with respect to one clutch weight 230. However, at least one clutch spring 235 that exerts force displacing the clutch shoe 236 in the direction separating from the clutch outer part 240 just has to be attached to one clutch weight 230. In this case, in the clutch spring 235, one of both ends can be attached to the second spring attachment part 234 and the other can be attached to the drive plate 210 for example. In this case, the force of clutch spring 235 acting on the clutch weight 230 and its action position are the force F2 and the action position FP2 for example, and number of the force and the position is one.

In addition, in the above embodiment, the projection body 218 is formed in a roller shape, and the driven part 238 is formed in a plane surface shape. However, the projection body 218 can be formed in a plane surface shape, and the driven part 238 can be formed in a rotatable roller shape or a curved surface shape that is provided in a non-rotatable and fixed manner.

In addition, in the above embodiment, the driven part 238 of the centrifugal clutch 200 includes a material that is easily worn compared with the projection body 218, such as a zinc material specifically. Therefore, in the centrifugal clutch 200, the driven part 238 wears more than the projection body 218 because the driven part 238 includes a material that is easily worn compared with the projection body 218. In this case, the driven part 238 is formed on the clutch weight 230 including the clutch shoe 236; therefore, the driven part 238 is renewed by the replacement of clutch weight 230 due to the wear of the clutch shoe 236. That is, in the centrifugal clutch 200, the replacement work of the clutch weight 230 caused by the wear of the clutch shoe 236 can also replace the driven part 238 with a new one simultaneously. Therefore, the maintenance load can be reduced.

LIST OF REFERENCE NUMERALS

TE . . . projection body range, F1 and F2 . . . force of clutch spring acting on clutch weight,
FP1 . . . position in thickness direction of clutch weight where force F1 acts on, FP2 . . . position in thickness direction of clutch weight where force F2 acts on,
100 . . . power transmission mechanism, 101 . . . transmission
110 . . . drive pulley, 111 . . . crank shaft, 112 . . . fixed drive plate, 112a . . . heat radiation fin,
113 . . . movable drive plate, 114 . . . sleeve bearing, 115 . . . roller weight, 116 . . . ramp plate,
120 . . . V-belt,
130 . . . driven pulley, 131 . . . fixed driven plate, 132 . . . driven sleeve, 133 . . . drive shaft, 134 . . . movable driven plate, 135 . . . torque spring,
200 . . . centrifugal clutch,
210 . . . drive plate, 211 . . . bottom part, 211a . . . penetration hole, 212 . . . tubular part, 213 . . . flange part, 214 . . . oscillation support pin, 214a . . . attachment bolt, 214b . . . E-ring, 215 . . . side plate, 216 . . . projection body support pin, 216a . . . attachment bolt, 217 . . . positioning body,
218 . . . projection body, 218a . . . penetration hole, 219 . . . damper receiving pin, 220 . . . damper, 230 . . . clutch weight, 231 . . . first spring attachment part, 232 . . . pin slide hole, 233 . . . spring storage part, 234 . . . second spring attachment part, 235 . . . clutch spring, 236 . . . clutch shoe,
237 . . . projection body relief part, 238 . . . driven part,
240 . . . clutch outer part, 241 . . . tubular surface.

The invention claimed is:

1. A centrifugal clutch, comprising:
a drive plate that receives driving force of an engine and is rotationally driven integrally with a driven pulley;
a clutch outer part that includes a tubular surface provided to be concentric to the drive plate outside the drive plate;
a plurality of clutch weights that includes a clutch shoe that is formed to extend along a circumferential direction of the drive plate and faces the tubular surface of the clutch outer part, one end part side in the circumferential direction that is rotatably attached on the drive plate via an oscillation support pin and an elongated pin slide hole, and the other end part side that is displaced toward a side of the tubular surface of the clutch outer part;
a side plate that is adjacently disposed on an opposite side of the drive plate with respect to the plurality of clutch weights;
a projection body that is provided on the drive plate or the side plate to protrude toward the clutch weight;
a driven part that is provided on the clutch weight and runs on the projection body when displaced to the other end part side of the clutch weight; and
a clutch spring that is attached to the clutch weight and acts on force in a direction that separates the other end part side of the clutch weight from the clutch outer part, wherein
the projection body and the driven part are formed in a manner that a projection body range between one end part and the other end part in a thickness direction of the clutch weight at a portion where the projection body and the driven part come into contact with each other overlaps an action position in the thickness direction of the clutch weight where force of the clutch spring acts on.

2. The centrifugal clutch according to claim 1, wherein a spring attachment part where the clutch spring is attached to the clutch weight is formed on a side closer to the side plate relative to the center part in the thickness direction of the clutch weight.

3. The centrifugal clutch according to claim 1, comprising:
a projection body support pin that is provided on the drive plate or the side plate in a standing state and supports the projection body by penetrating the projection body; and
a positioning body that is disposed between the projection bodies and on the drive plate or the side plate having the projection body support pin provided.

4. The centrifugal clutch according to claim 1, wherein in the projection body and the driven part, a center position of the projection body range aligns with the action position of the force of the clutch spring acting on the clutch weight.

5. The centrifugal clutch according to claim 1, wherein at least one of the projection body and the driven part includes a roller that is rotatably supported.

6. The centrifugal clutch according to claim 1, wherein two or more projection bodies are provided along the thickness direction of the clutch weight.

* * * * *